US011768529B2

(12) United States Patent
Bhagavathula et al.

(10) Patent No.: US 11,768,529 B2
(45) Date of Patent: Sep. 26, 2023

(54) SYSTEM AND METHOD FOR ENABLING POWER SHARING IN A MULTIPORT POWER SOURCING DEVICE

(71) Applicant: SILICONCH SYSTEMS PVT LTD, Karnataka (IN)

(72) Inventors: Siva Naga Subrahmanya Saratchandra Bhagavathula, Telangana (IN); Rakesh Kumar Polasa, Karnataka (IN); Kaustubh Kumar, Uttar Pradesh (IN); Munnangi Sirisha, Andhra Pradesh (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 62 days.

(21) Appl. No.: 17/561,566

(22) Filed: Dec. 23, 2021

(65) Prior Publication Data
US 2022/0221921 A1      Jul. 14, 2022

(30) Foreign Application Priority Data

Jan. 12, 2021   (IN) .............................. 202141001432

(51) Int. Cl.
*G06F 1/26* (2006.01)
(52) U.S. Cl.
CPC ...................... *G06F 1/26* (2013.01)
(58) Field of Classification Search
None
See application file for complete search history.

(56) References Cited

U.S. PATENT DOCUMENTS

| 5,784,581 A * | 7/1998 | Hannah | G06F 13/4291 |
| | | | 710/110 |
| 2010/0205463 A1* | 8/2010 | Magnusson | G06F 1/266 |
| | | | 713/300 |
| 2013/0013936 A1* | 1/2013 | Lin | G06F 1/266 |
| | | | 713/300 |

(Continued)

OTHER PUBLICATIONS

Universal Serial Bus Type-C Cable and Connector Specification Release 2.0, USB 3.0 Promoter Group, Aug. 2019 (373 pages).

(Continued)

*Primary Examiner* — Danny Chan
(74) *Attorney, Agent, or Firm* — Procopio, Cory, Hargreaves & Savitch LLP (57) ABSTRACT

The present disclosure relates to a system and method for enabling power sharing in a multi-port power sourcing device. The system comprises of a multiport power sourcing device having a plurality of ports and a plurality of pre-defined resistances configured to each port of the plurality of ports and is configured to receive input parameters related to plurality of ports, total power capacity of the device and maximum power of each port, determine a second set of parameters associated with pre-defined resistances, execute a first set of instructions based on the input parameters and the second set of parameters, execute a second set of instructions based on the executed first set of instructions to facilitate implementation via a request-response communication interface to discover and track any or a combination of number and status of the plurality of ports based on the determined second set of parameters.

14 Claims, 5 Drawing Sheets

(56) References Cited

U.S. PATENT DOCUMENTS

| | | | | |
|---|---|---|---|---|
| 2013/0166937 A1* | 6/2013 | Tu | .............................. | G06F 1/28 |
| | | | | 713/340 |
| 2015/0324313 A1* | 11/2015 | Lin | ..................... | G06F 11/3051 |
| | | | | 710/104 |
| 2016/0232122 A1* | 8/2016 | Margabandu | ........... | G06F 13/00 |
| 2016/0321195 A1* | 11/2016 | Ghosh | ................... | G06F 13/102 |
| 2017/0270067 A1* | 9/2017 | Hu | ...................... | G06F 13/4068 |
| 2021/0072808 A1* | 3/2021 | Kim | ...................... | G06F 1/3215 |
| 2022/0113776 A1* | 4/2022 | Bhagavathula | ......... | G06F 1/266 |

OTHER PUBLICATIONS

Universal Serial Bus Power Delivery Specification, Revision 3.0, Version 2.0, Aug. 29, 2019 (657 pages).

* cited by examiner

SYSTEM AND METHOD FOR ENABLING POWER SHARING IN A MULTIPORT POWER SOURCING DEVICE

CROSS REFERENCE TO RELATED APPLICATIONS

This Paris Convention patent application claims benefit under 35 U.S.C. § 119 and claims priority to Indian Patent Application No. IN 202141001432, filed on Jan. 12, 2021, titled "SYSTEM AND METHOD FOR ENABLING POWER SHARING IN A MULTIPORT POWER SOURCING DEVICE", the content of which is incorporated herein in its entirety by reference for all purposes.

TECHNICAL FIELD

The present disclosure relates to multi-port power sourcing device and more particularly, relates to system and method for enabling power sharing in a multiport power sourcing device.

BACKGROUND

In assured capacity multiport adapters, each port is able to deliver its rated/labeled power capacity independent of all other ports while in shared capacity multiport adapters, and each port is able to deliver its rated/labeled capacity after the balanced distribution of power to other previously connected ports shared among multiple ports. The total available power capacity of the multiple ports may be indicated to the user, and all ports on the charger may be capable of delivering the same power rating.

The existing multiport adapters provide dynamic power allocation and redistribution. With increasing number of Universal Serial Bus (USB) ports in multi-port adapters, the power demand may also accentuate. Further, to accommodate faster charging, effective power distribution may be necessary. However, the existing multiport adapters fail to do so as they are ineffective in understanding initial workability in terms of total number and corresponding status of ports. Further, without the knowledge of the status of the port, sudden power requirements may not be met, resulting in inefficient functioning and performance of such ports. The existing multiport adapters may also not be very operative in terms of power allocation and re-allocation due to limited information transfer between the ports for better operability at the outset.

There is, therefore, a need in the art for a system and method that can facilitate effective power sharing by an automated discovery of number of ports and status of ports in a multiport power sourcing device.

SUMMARY

Some of the objects of the present disclosure aimed to ameliorate one or more problems of the prior art or to at least provide a useful alternative are listed herein below.

An object of the present disclosure is to provide a system and a method that facilitates power sharing in a multiport power sourcing device.

An object of the present disclosure is to provide a system to enable automated discovery of number of ports and their corresponding status.

An object of the present disclosure is to provide a system to facilitate auto-detection of communication failure in a port.

An object of the present disclosure is to provide for a system and method that facilitates power allocation, deallocation and information exchange in terms of power at an abstract level, so as to reduce the communication/service time for one port and thus provide least latency in servicing all the ports, even if all ports need servicing simultaneously.

An object of the present disclosure is to provide a system and a method that facilitates dynamic power distribution in multiport power sourcing devices while complying with base rules specified by USB Type-C, USB Type-A, USB power delivery specifications and other charging protocols.

The present disclosure relates to multi-port power sourcing device and more particularly, relates to system and method for enabling power sharing in a multiport power sourcing device by an automated discovery of number of ports and status of ports in a multiport power sourcing device.

In an aspect, the present disclosure provides for a system enabling power sharing in multiple ports in a multiport power sourcing device. The system may include: multi-port power sourcing device including a plurality of ports and a plurality of pre-defined resistances configured to each port of the plurality of ports. The multiport power also may include a processor that may execute a set of executable instructions that are stored in a memory, upon which execution, the processor may cause the multiport power sourcing device to sourcing device may be configured to: receive by a first set of instructions, one or more input parameters pertaining to the plurality of ports of the device, total power capacity of the device and maximum power of each port of the plurality of ports, determine by a second set of instructions, a second set of parameters pertaining to parameters associated with the plurality of pre-defined resistances configured to each port of the plurality of ports; execute a first set of instructions based on the input parameters and the second set of parameters, the first set of instructions pertaining to power allocation, deallocation, information exchange, across each of the port of the plurality of ports of the multi-port power sourcing device; execute a second set of instructions based on the executed first set of instructions, the second set of instructions being executed to manage at least one operation pertaining to each port of the plurality of ports. The executed first set of instructions can facilitate implementation of the second set of instructions by communication via a request-response communication interface, and based on the determined second set of parameters and the communication, the second set of instructions can enable automated determination of any or a combination of number of the plurality of ports and status of the each port.

In an embodiment, each of the port of the plurality of ports of the multi-port power sourcing device may be any of a Universal Serial Bus (USB) Type-C port and a USB Type-A port, and where each of the plurality of ports may comply to a predefined USB power delivery specification and to a predefined charging protocol.

In an embodiment, the first set of instructions may reside in a first physical entity (master), and the second set of instructions may reside in a second physical entity (slave). The first set of instructions, on power-on of the multi-port adapter device, may send out a discovery request over a physical communication interface addressing the second set of instructions on a one on one basis. The second set of instructions may respond to the discovery request made by the first set of instructions to enable the first set of instructions to keep a track of the number of ports connected, and power distribution mechanism may be decoupled into master and slave for a single port.

In an embodiment, the system may be configured to support dynamic hot-plug addition of any or a combination of a new slave port and replacement of an existing slave port to the communication interface.

In an embodiment, upon execution of the second set of instructions based on the first set of instructions, the request-response communication interface may perform any or a combination of device connection/disconnection detection, dynamic power allocation and redistribution and adaptive sink current sensing, but not limited to the like for any or a combination of shared capacity and assured capacity power adapters.

In an embodiment, when the multi-port power sourcing device is switched on, the first set of instructions executed on the multi-port power sourcing device may activate each of the second set of instructions associated with each of the ports, and wherein the first set of instructions may be configured to maintain record of allocated power across the plurality of ports and may inform each of the second set of instructions about power to be allocated. The second set of instructions may be configured to enable delivery of power over the physical USB port based on a predefined protocol and the first set of instructions.

In an embodiment, execution of the first set of instructions may enable any initialization or reset of the plurality of ports by sending a first data packet to synchronize initialization of the plurality of ports. Upon the execution of the first set of instructions, initial power may be allocated to the plurality of ports, and the initial power allocated to the plurality of ports may be any or a combination of a fixed power values in a first configuration, and variable power values in a second configuration.

In an embodiment, the first set of instructions and the second set of instructions can use the predefined resistors associated with each of the plurality of ports to configure the port regarding port address, master status, Port-ID, Maximum Port power according any or a combination of the first configuration and the second configuration. The predefined resistors may also enable any port of the plurality ports to act as any master or slave.

In another embodiment, a plurality of controllers operatively coupled to each port can control port communication to enable auto discovery of the port status based on the plurality of ports tracked by the first set of instructions through the fixed format of the predefined resistors associated with each port.

In an embodiment, upon execution of the second set of instructions based on the first set of instructions, the request-response communication interface may perform any or a combination of sending, broadcasting and cyclic redundancy check (CRC) of communication packets to all ports through a shared bus. The shared bus can be Inter-integrated circuit (I2C) bus, peripheral component interconnect (PCI) bus but not limited to the like and the request-response communication packets may be sent through but not limited to physical layer.

In yet another embodiment, the CRC can be configured to handle error correction of distorted data occurring due to high frequency switching noise in the physical layer.

In an embodiment, upon execution of the second set of instructions based on the first set of instructions, the request-response communication interface may provide a configurable retry mechanism for non-responsive and failed communications.

In an embodiment, upon execution of the second set of instructions the request-response communication interface may enable recovery of irresponsive ports through a watchdog mechanism, which facilitates periodic execution of the first set of instructions to enable the second set of instructions to reset a watchdog timer internal to the port and upon timer expiry, reset the port, and communication block.

In an embodiment, the second set of instructions may be configured to raise an alert signal associated with an event and upon receiving the alert, the first set of instructions may determine action to be taken for the event and may update a database about the plurality of ports.

In an aspect of the present disclosure is provided a method for enabling power sharing in multiple ports in a multiport power sourcing device. The method may include the steps of: receiving at the multi-port power sourcing device by a first set of instructions, one or more input parameters pertaining to plurality of ports of the device, total power capacity of the device and maximum power of each port of the plurality of ports, determining at the multi-port power sourcing device by a second set of instructions, a second set of parameters pertaining to parameters associated with predefined resistances configured to each port of the plurality of ports, executing at the multi-port power sourcing device, a first set of instructions based on the input parameters and the second set of parameters, the first set of instructions pertaining to power allocation, deallocation, information exchange, across each of the port of the plurality of ports of the multi-port power sourcing device, executing, at the multi-port power sourcing device, a second set of instructions based on the executed first set of instructions, the second set of instructions being executed to manage at least one operation pertaining to each port of the plurality of ports. The executed first set of instructions facilitate implementation of the second set of instructions by communication via a request-response communication interface, and based on the determined second set of parameters and the communication, the second set of instructions enable automated determination of any or a combination of number of said plurality of ports and status of each port.

Various objects, features, aspects and advantages of the present disclosure will become more apparent from the following detailed description of preferred embodiments, along with the accompanying drawing figures in which like numerals represent like features.

BRIEF DESCRIPTION OF THE ACCOMPANYING DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

A few portions of the embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as Read only memories (ROMs), random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

The present disclosure relates to a method for dynamic allocation, redistribution and broadcasting of signals more importantly power sharing in a multiport power sourcing device.

The terms 'master' and 'slave' used herein pertain to a model of asymmetric communication or control where one device or ports or a set of instructions (the 'master') controls one or more other devices or ports or another set of instructions (the 'slaves') and serves as their communication hub. In some systems a master is selected from a group of eligible devices or ports, with the other devices acting in the role of slaves. Master port also has an internal slave or second set of instructions.

In an embodiment, is provided a method for facilitating power sharing over USB Type-C/Type-A ports of a multi-port power sourcing device. The number of ports may be not limited for all practical requirements. Each port of the number of ports may be of USB Type-C or USB Type-A. Power sharing across each port of the number of ports may be controlled by a coordinated pair of a first set of instructions which act as the master (also referred to herein as master control mechanism or master control algorithm or MCA) and a second set of instructions which act as the slaves (also referred to herein as slave handler or slave handler algorithm or SHA).

In an embodiment, the MCA and the SHA can both be implemented on any or a combination of hardware and a firmware running on a microcontroller, microprocessor, any computing engines and the like.

Communication interface and packets between MCA and SHA can facilitate a request-response handshake. Requests can be provided from MCA and responses can be generated from SHAs for the corresponding requests provided by the MCA. When SHA wants to talk to MCA or notify MCA of any event or respond to MCA, the SHA can use the alert mechanism to interact with MCA. The communication requests and responses may include power allocation, deallocation, information exchange and the like only in terms of power (neither voltage nor current) at an abstract level, so as to reduce communication/service time for one port and provide least latency in servicing all the ports, even if all ports need servicing simultaneously.

In an embodiment, each of USB Type-C port may support various power delivery/fast charging protocols that also includes USB Type-C power delivery protocol.

Further, each of USB Type-A port may support various fast charging protocols apart from minimally providing a battery charging 1.2 (BC 1.2) dedicated charging port (DCP) functionality and power. In an exemplary embodiment, the fast charging protocols can be QuickCharge (QC) and the like.

The disclosure provides a method for managing power distribution across each port of the number of ports of the multi-port power sourcing device.

In an embodiment, the MCA may be protocol agnostic and may have one instance, and the SHA may have one instance per port. The MCA may maintain a record of the allocated power across various ports and available power, and may control the SHAs via a request-response communication interface. In this case, the SHA may deliver power over VBUS line of physical USB port based on active power negotiation protocol out of the supported protocols and based on the control requests from the MCA.

In an embodiment, the multi-port power sourcing device may support multiple power negotiation protocols over a port (for example, USB-Power Delivery (USBPD), QuickCharge, and the like) but based on the sink connected, at an instant, one protocol may be active for delivering power.

In an embodiment, a request-response communication interface between MCA and SHAs can facilitate a request-response handshake. The requests can be from MCA and responses can be from SHAs, where some of the requests may not require any response, and where the SHA can use the communication interface to alert MCA of an event, and where the communication requests and responses can include power allocation, deallocation and information exchange in terms of power at an abstract level, so as to reduce the communication/service time for one port and thus can provide least latency in servicing all the ports, even if all ports need servicing simultaneously.

In yet another embodiment, the request-response communication interface can include bus architecture where there can be a shared bus but not limited to it where MCA and SHAs can be connected and MCA can send communication packets individually to all ports and also can broadcast packets instantly to all the ports. In an exemplary embodiment, the request-response communication interface may be implemented over but not limited to inter integrated circuit (I2C) bus.

In yet another embodiment, the request-response communication interface between MCA and SHAs can provide for a CRC check for all the communication packets in the request-response handshake because the physical communication interface may be exposed to high frequency switching noise and there is possibility of receiving distorted data.

In yet another embodiment, where there can be a possibility of noise in the request-response communication interface between MCA and SHAs, the request-response communication interface can provide a retry mechanism for any non-responsive and failed communications where the maximum number of retries can be configurable.

Further, in another embodiment, the request-response communication interface between MCA and SHAs can be used to auto-discover the number of ports by MCA for multi-port implementations wherein SHA and MCA can reside in a separate physical entity in the port and MCA will be active in one of the ports. The MCA, on power-on of the device, can send out a discovery request over a physical communication interface addressing each SHA one by one, and where the physically present SHAs can respond to the discovery request made by MCA, and thereby the MCA can keep track of the number of ports connected.

Furthermore, in an embodiment, the MCA and SHA can use a resistor based mechanism for configuring a port regarding the slave address, Master status, Port-ID, Maximum Port power of each port of the plurality of ports according to any pre-defined power levels and a custom power level configuration. In an exemplary embodiment, the SHA can determine the Master setting of a port during the initial power-up of the device and can enable MCA if it can be configured as master and thus, other ports then can act as slaves. In another exemplary embodiment, pre-defined resistances can be configured to each port corresponding to any or a combination of Master setting, Port-ID, Maximum Port Power configurations but not limited to the like.

In another embodiment, the SHA can assign the slave address and the Maximum Port Power rating through the resistor based mechanism and the MCA can use the slave addresses and the request-response communication interface to facilitate an auto-detecting of the number of ports.

In yet another embodiment, in an initialization phase, the MCA can initializes/reset all the slaves using a generic broadcast communication packet which can be sent over to all the slave ports, and synchronize initialization phases of all slave ports.

Further, the MCA can allocate initial power to all the slave ports during the initialization-synchronization phase. In an exemplary embodiment, the initial powers of different ports can be a fixed value in a first configuration. In yet another exemplary embodiment, the initial powers of different ports can be different in a second configuration.

Furthermore, in an embodiment, the MCA while communicating to SHA, the MCA may perform actual request-response handshake by sending the communication packets through a physical layer. In yet another embodiment, the MCA may bypass the communication to internal SHA and may not send/receive actual communication packets through the physical layer.

In another embodiment, a Watchdog mechanism can be provided by the MCA for irresponsive ports recovery. In an exemplary implementation, the MCA can send a periodic WATCHDOG_RESET to all SHA enabled ports SHA. The SHA upon receiving the WATCHDOD_RESET, can reset a watchdog timer internal to the port and the watchdog timer can be restarted. In yet another implementation, whenever there is an irresponsive port which could not receive WATCHDOG_RESET, would not restart the watchdog timer and upon the watchdog timer expiry, can reset the port and can reset communication block to help maintain the request-response handshake mechanism alive.

Further in an embodiment, the MCA can use a Broadcast mechanism to send a command to all slave ports using a single communication packet where the MCA can use a generic slave address for the Broadcast mechanism. In another embodiment, when SHA requires to communicate to MCA about any new event occurrence or when SHA requires to respond to any request sent by MCA, SHA can raise an alert to the MCA with the event information. Upon receiving the alert, MCA can use the alert to determine action to be taken for that event and can update local databases of information about the port.

Referring to the drawings, the invention will now be described in more detail.

Figure 1:
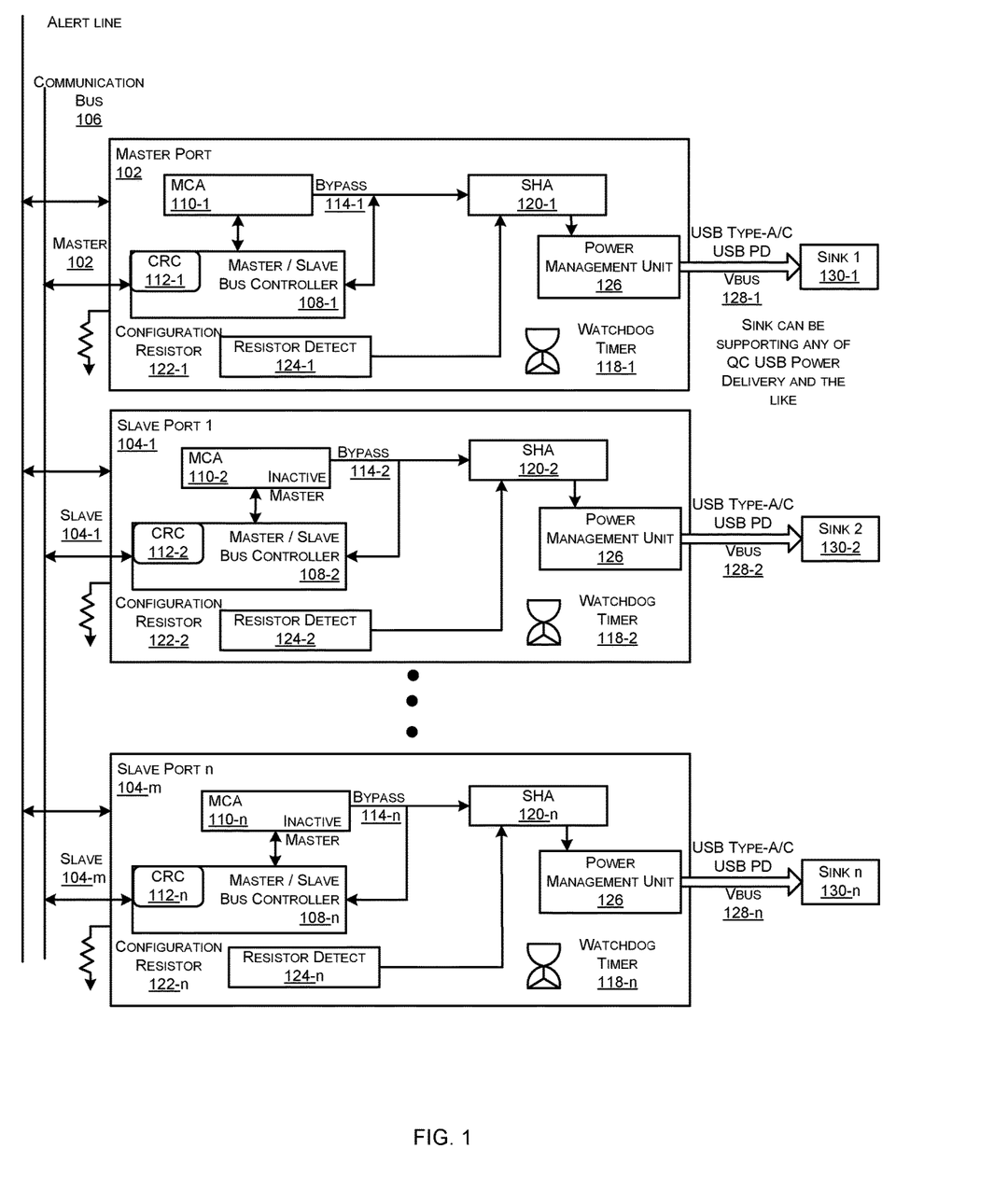
FIG. 1 illustrates an exemplary representation of a multiport device architecture with first set of instructions and second set of instructions and the related modules for performing operations between master and slave ports of the power sourcing device in accordance with an embodiment of the present disclosure.

FIG. 1 illustrates an exemplary representation of a multiport device architecture with first set of instructions (MCA) and second set of instructions (SHA) and the related modules for performing operations between master and slave ports of the power sourcing device in accordance with an embodiment of the present disclosure. Each port in the multiport device can include both first set of instructions (MCA) and second set of instructions (SHA), but the first set of instructions will be active on any one port (also referred to as the active master port with active MCA). Referring to FIG. 1, the further description assumes the active master port as port1.

As illustrated, the multiport device can include a master port 102, a plurality of slave ports 104-1, . . . 104-$m$, where $m=n-1$ (collectively referred to as slave ports 104 and individually referred to as slave port 104) wherein each slave port 104 can be different from each other in the sense of the power protocol that each slave port 104 follows, a communication bus 106, USB type A,C/USB PD VBUS 128-1, 128-2, . . . 128-$n$ and a plurality of sinks 130-1, 130-2, . . . 130-$n$ (collectively referred to as sinks 130 and individually referred to as sink 130). The sinks 130 too can be different from each of the plurality of sinks 130 in the sense of different power sinking capacity of each sink 130.

In an embodiment, the master port 102 can include a first set of instructions 110-1 (interchangeably referred to as MCA 110-1) which is the active MCA and further coupled to Master/Slave Bus Controller 108-1. The Master/Slave Bus controller 108-1 can further include a CRC block 112-1. The Master/Slave Bus controller 108-1 can transfer data to the communication bus 106 via a master line. In yet another embodiment, the Master port 102 also has SHA (120-1) internal to it. So MCA 110-1 can talk to SHA 120-1 directly using bypass 114-1 or using Bus controller (108-1).

In an embodiment, the MCA 110-1 on power-on of the multi-port adapter device, can send out a discovery request over a physical communication bus 106 using bus controller 108-1 addressing the SHA 120 on a one on one basis. The SHAs 120 can respond to the discovery request made by the MCA 110-1 to enable the MCA 110-1 to keep a track of the number of ports (master port 102 and slave ports 104) connected.

In another embodiment, the plurality of Master/Slave Bus controllers 108-1, 108-2, . . . 108-$n$ (collectively referred to as Master/Slave Bus controllers 108) operatively coupled to each port, control port communication to enable auto discovery of the port status based on the plurality of ports tracked by the MCA 110-1, 110-2, . . . 110-$n$ through the fixed format of the predefined resistors 122 associated with each port.

The Cyclic Redundancy Check (CRC) block 112-1, 112-2, . . . 112-$n$ (referred collectively as CRC block 112) can be configured to find errors occurring in the data packets during communication between master 102 and slave ports 104.

The errors may occur due to high frequency switching noise associated with the Master/Slave Bus controllers 108 and power controllers associated with each port which can hinder communication across the ports. The presence of the CRC block 112 can let MCA 110-1 and SHA 120 to retry the communication of same packet and can facilitate elimination of any invalid communication.

In yet another embodiment, the Master port 102 can have a configuration resistor 122-1 that can be detected by the resistor detect block 124-1 which thereby can send the resistor value to the SHA 120-1 internal to the Master port 202. The SHA 120-1 can in turn determine accurately that the configuration resistor 122-1 can make the port 102 as master which can further enable auto-detection of the master port 102 to ensure accurate broadcasting of communication packets to the required port.

In an embodiment, a first slave port 104-1 can include a first set of instructions 110-2 (interchangeably referred to as MCA 110-2) which can remain in an inactive state based on the configuration resistor 122-2. The second set of instructions 120-2 or SHA 120-3 can take control by coupling to Master/Slave Bus Controller 108-2. The Master/Slave Bus controller 108-2 can further include a CRC block 112-2. The Master/Slave Bus controller 108-2 can transfer data to the communication bus 106 via a slave line.

In yet another embodiment, the first slave port 104-1 can have a configuration resistor 122-2 that can be detected by the resistor detect block 124-2 which thereby can send the resistor value to the SHA 120-2. The SHA 120-2 can in turn determine accurately that the configuration resistor 122-2 pertains to the slave port 104-1 which can further enable auto-detection of the slave port 104-1 to ensure accurate broadcasting of communication packets to the required port.

In an embodiment, there can be a slave port 104-$m$, where $m=n-1$ that can include a first set of instructions 110-$n$ (interchangeably referred to as MCA 110-$n$) which can remain in an inactive state. Here the second set of instructions 120-$n$ or SHA 120-$n$ can take control by coupling to Master/Slave Bus Controller 108-$n$. The Master/Slave Bus controller 108-$n$ can further include a CRC block 112-$n$. The Master/Slave Bus controller 108-$n$ can transfer data to the communication bus 106 via a slave line.

In yet another embodiment, the slave port 104-$m$ can have a configuration resistor 122-$n$ that can be detected by the resistor detect block 124-$n$ which thereby can send the resistor value to the SHA 120-$n$. The SHA 120-$n$ can in turn determine accurately that the configuration resistor 122-$n$ pertains to the slave port 104-$n$ which can further enable auto-detection of the slave port 104-$n$ to ensure accurate broadcasting of communication packets to the required port. Likewise, there can be n slave ports which can include all the n functional blocks associated with the n slave ports mentioned herein above.

Thus, the predefined resistors 122 coupled to resistor detect blocks 124 associated with each of the plurality of ports can configure each port regarding port address, master status, Port-ID, Maximum Port power according to any or a combination of the first configuration and the second configuration.

In an embodiment, each port of the multiport device 100 including master port 102 and each port of the plurality of slave ports 104 can be coupled to a power management unit 126 further coupled to a sink 130 associated with each port via any or USB-Type A, Type-C and VBus 128.

In an embodiment, the execution of SHA 120-1, 120-2, . . . 120-$n$ (collectively referred to as SHA 120 and individually as SHA 120) based on the MCA 110-1, the request-response communication interface can perform any or a combination of device connection/disconnection detection, dynamic power allotment and redistribution managed by the power management unit 126, adaptive current sink sensing, fault handling such as over-current, over-temperature but not limited to the like for any or a combination of shared capacity and assured capacity power adapters.

In yet another embodiment, the MCA 110-1 can maintain record of allocated power across the plurality of ports and inform each of the SHAs 120 about power to be allocated and each of the SHAs can be configured to enable delivery of power over the physical USB port based on a predefined protocol through the power management unit 126 and defined by the MCA 110.

In another embodiment, the MCA 110-1 can enable any initialization or reset of the plurality of ports (master port 102 and slave ports 104) by sending a first data packet to synchronize initialization of the plurality of ports. The MCA 110-1 can allocate power allocated to the plurality of ports in any or a combination of a fixed power values in a first configuration, and variable power values in a second configuration.

Each port can further include a watchdog timer 118-1, 118-2, . . . 118-$n$ (collectively referred to as watchdog timers 118 and individually as watchdog timer 118) configured to reset the port and communication block to help maintain the request-response handshake mechanism alive.

In an embodiment, the watchdog timer 118 can enable recovery of irresponsive ports by periodic execution of the MCA 110-1 to enable the SHA 120 to reset the watchdog 118 timer internal to the port and upon timer expiry, reset the port, and communication block.

Figure 2:
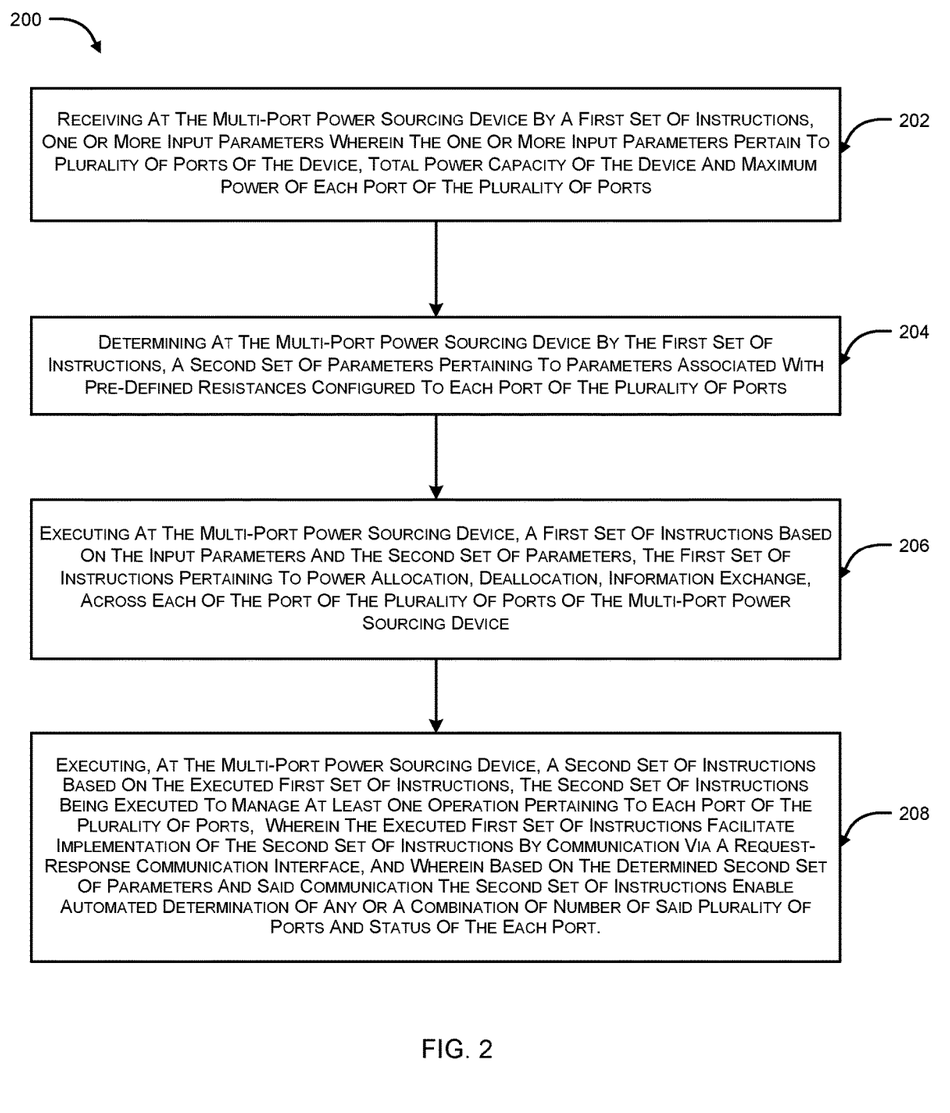
FIG. 2 illustrates an exemplary method flow diagram depicting dynamic power distribution in a multiport power sourcing device, in accordance with an embodiment of the present disclosure.

FIG. 2 illustrates exemplary method flow diagram depicting power sharing in a multiport power sourcing device, in accordance with an embodiment of the present disclosure.

As illustrated, at step 202, the method includes the step of receiving at the multi-port power sourcing device by a first set of instructions, one or more input parameters pertaining to plurality of ports of the device, total power capacity of the device and maximum power of each port of the plurality of ports and a step 204 for determining at the multi-port power sourcing device by the first set of instructions, a second set of parameters pertaining to parameters associated with pre-defined resistances configured to each port of the plurality of ports.

Further, at step 206, the method includes the step of executing at the multi-port power sourcing device, a first set of instructions based on the input parameters and the second set of parameters, the first set of instructions pertaining to power allocation, deallocation, information exchange, across each of the port of the plurality of ports of the multi-port power sourcing device; and a step 208 for executing at the multi-port power sourcing device a second set of instructions based on the executed first set of instructions, the second set of instructions being executed to manage operations pertaining to a single port of the plurality of ports of the multi-port power sourcing device. In an embodiment, the executed first set of instructions facilitate implementation of the second set of instructions by communication via a request-response communication interface. In yet another embodiment, based on the determined second set of parameters and the communication, the second set of instructions can enable automated determination of any or a combination of number of said plurality of ports and status of the each port.

Figure 3:
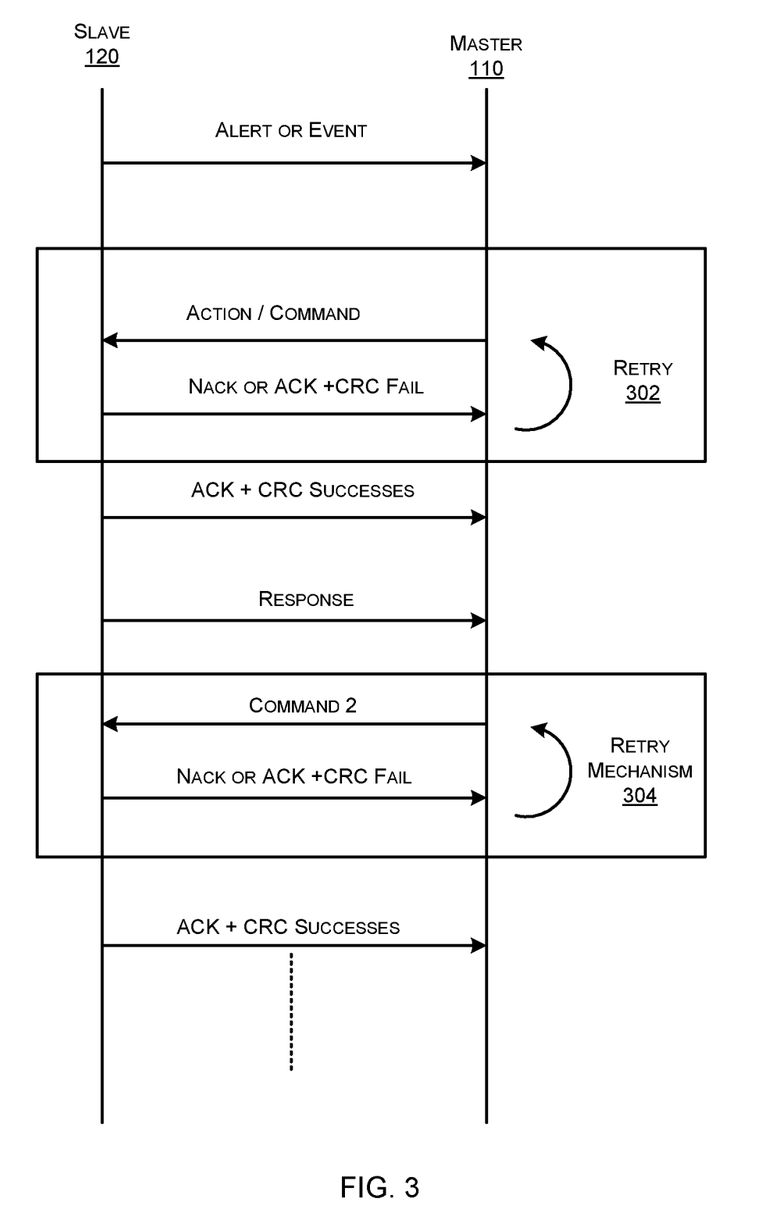
FIG. 3 illustrates an exemplary representation of a retry mechanism between master and slave ports in a multiport power sourcing device in accordance with an embodiment of the present disclosure.

FIG. 3 illustrates an exemplary representation of a retry mechanism between master and slave ports in a multiport power sourcing device in accordance with an embodiment of the present disclosure.

In an embodiment, a request-response communication interface between MCA 110-1 and SHA 120 can provide a retry mechanism for any non-responsive and failed communications where the maximum number of retries can be configurable. As illustrated, the SHA 120 can send an alert or event to the MCA 110-1. The MCA 110-1 can send action/command to the SHA 120 after the alert is raised. If the SHA 120 fails to respond or CRC fail happens, then retry can be done by the MCA 110-1. Retry can happen if NACK or ACK+CRC fail happens. If the SHA 120 can respond with ACK and CRC is also successful, then it can be deemed as successful transaction between the MCA 110-1 and the SHA 120. The SHA 120 can then send response to the command sent by the MCA 110-1.

Figure 4:
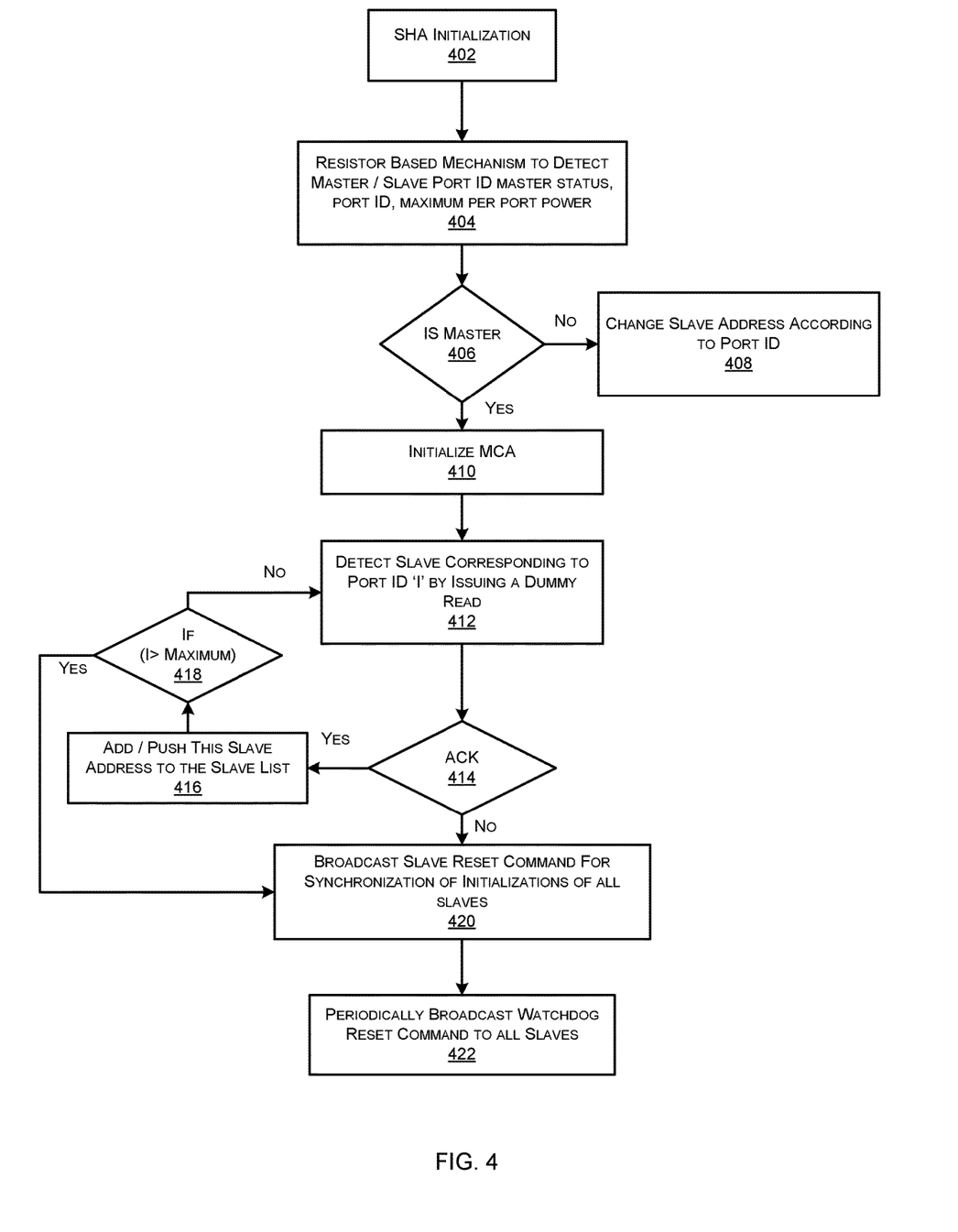
FIG. 4 illustrates an exemplary flow diagram representation of a broadcast routine of the ports in a multiport power sourcing device and general initialization sequence in accordance with an embodiment of the present disclosure.

FIG. 4 illustrates an exemplary flow diagram representation of a broadcast routine of the ports in a multiport power sourcing device and general initialization sequence in accordance with an embodiment of the present disclosure.

As illustrated, upon SHA initialization at block 402, the resistor based mechanism to detect master/slave port ID at block 404 can be activated and then sent to a decision block 406 to detect the if it is a master. If no, then continue as SHA and at block 408 to change slave address according to port ID. If yes, then at block 410 MCA is initialized, after which at block 412, slave detection starts according to port id 'i' by issuing a dummy read. If ACK is received (414), then at block 416 push the slave address to slave list and then at block 418 increment the port address by i++ and then again repeat steps from block 412. If ACK is not received at block 414, just increment i at 418 and loop through steps 412, 414, 416, 418 until all the maximum number of slaves are detected. Once all the slaves are detected, then at block 420, MCA broadcasts slave reset command for synchronization initialization of all slaves and after synchronization initialization is performed, at block 422, periodically broadcast watchdog reset command to all slaves can be performed.

Figure 5:
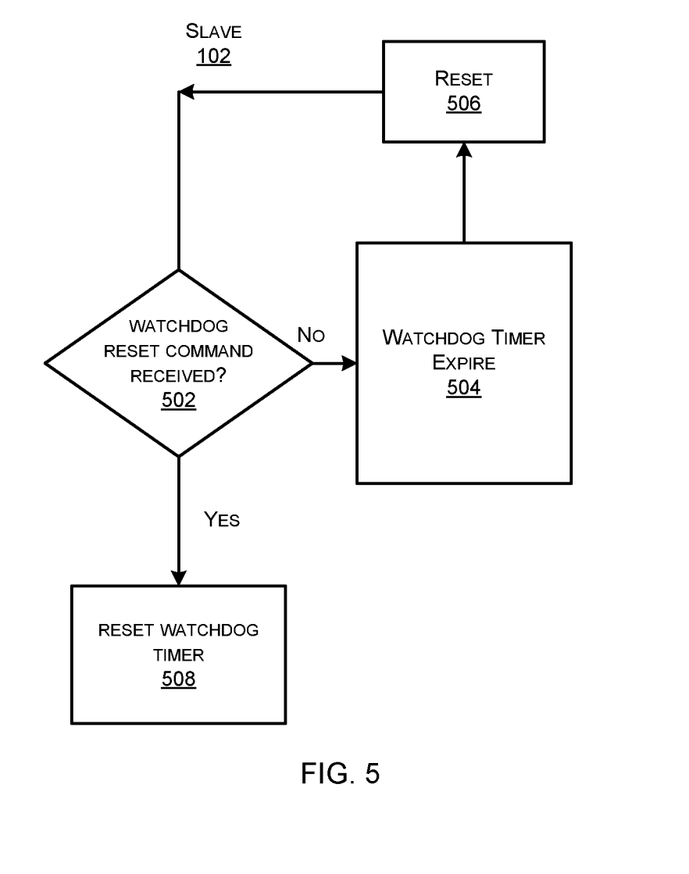
FIG. 5 illustrates an exemplary flow diagram representation of the working of a watchdog timer mechanism in a multiport power sourcing device in accordance with an embodiment of the present disclosure.

FIG. 5 illustrates an exemplary flow diagram representation of the working of a watchdog timer mechanism in a multiport power sourcing device in accordance with an embodiment of the present disclosure.

As illustrated, at block 120 with SHA, if watchdog reset command is received at block 502, then at block 508 the flow resets the watchdog timer. If the watchdog reset command is not received at block 502, then at block 504, if the watch dog timer expires and then at block 506, the port reset happens.

The watchdog timer mechanism can thus enable recovery of irresponsive ports through periodic execution of the MCA 110-1 to enable the SHA 120 to reset the watchdog timer 118 internal to the port and upon timer expiry, reset the port, and communication block.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present disclosure provides a system and a method that facilitates improved power sharing in a multiport power sourcing device.

The present disclosure provides a system that enables automated discovery of number of ports and their corresponding status.

The present disclosure provides a system to facilitate auto-detection of communication failure in a port.

The present disclosure provides a system and a method that facilitates power allocation, deallocation and information exchange in terms of power at an abstract level, so as to reduce the communication/service time for one port and thus provide least latency in servicing all the ports, even if all ports need servicing simultaneously.

The present disclosure provides a system and a method that facilitates to handle detection of a device connection/disconnection, dynamic power allotment through USB Power Delivery messages, adaptive current sink sensing and the like.

The present disclosure provides a system and a method that facilitates dynamic power distribution in a USB Type-C/Type-A based multiport power sourcing device.

The present disclosure provides a system and a method that facilitates dynamic power distribution in multiport power sourcing devices while complying with base rules specified by USB Type-C, USB Type-A, USB power delivery specifications and other charging protocols.

We claim:

1. A system to enable power sharing in a multi-port power sourcing device, said system comprising:

the multi-port power sourcing device, wherein the multiport power sourcing device comprises a plurality of ports and a plurality of pre-defined resistances configured to each port of the plurality of ports, wherein the multiport power sourcing device comprises a processor that executes a set of executable instructions that are stored in a memory, which upon execution, the processor causes the multiport power sourcing device to:

receive a first set of instructions, one or more input parameters, wherein the one or more input parameters pertain to the plurality of ports associated with the multiport power sourcing device, total power capacity of the multi-port power sourcing device, and maximum power limit of each port of the plurality of ports;

determine by a second set of instructions, a second set of parameters pertaining to the pre-defined resistances configured at the each port of the plurality of ports;

execute the first set of instructions based on the one or more input parameters and the second set of parameters, the first set of instructions pertaining to any or a combination of power allocation, de-allocation, information exchange related to power across the plurality of ports;

execute the second set of instructions based on the executed first set of instructions, the second set of instructions being executed to manage at least one operation pertaining to each port of the plurality of ports, wherein the executed first set of instructions facilitate implementation of the second set of instructions by communication via a request-response communication interface, wherein, based on the determined second set of parameters and said communication, the second set of instructions enable automated determination of any or a combination of a number of the plurality of ports and a status of the each port of the plurality of ports, wherein, when the multi-port power sourcing device is switched on, the first set of instructions executed on the multi-port power sourcing device activates each of the second set of instructions associated with each of the ports, wherein a master port is configured to maintain record of allocated power across the plurality of ports and inform each of the second set of instructions about power to be allocated, and wherein the second set of instructions are configured to enable delivery of power over its corresponding physical USB port based on a predefined protocol and the first set of instructions.

2. The system as claimed in claim 1, wherein the each port of the plurality of ports is any of a Universal Serial Bus (USB) Type-C port and a USB Type-A port, and wherein the each of the plurality of ports comply to any or a combination of a predefined USB power delivery specification and a predefined charging protocol.

3. The system as claimed in claim 1, wherein the first set of instructions reside in a first physical entity configured as a master, and the second set of instructions reside in a second physical entity configured as a slave, wherein the first set of instructions, on power-on of the multi-port power sourcing device, sends out a discovery request over a physical communication interface addressing the second set of instructions on a one on one basis, and wherein the second set of instructions respond to the discovery request made by the first set of instructions to enable the first set of instructions to keep a track of the number of ports connected, and wherein power distribution mechanism is decoupled into master and slave for a single port.

4. The system as claimed in claim 1, wherein the system is configured to support dynamic hot-plug addition of any or a combination of a new slave port and replacement of an existing slave port to the communication interface.

5. The system as claimed in claim 1, wherein upon execution of the second set of instructions based on the first set of instructions, the request-response communication interface performs any or a combination of device connection/disconnection detection, dynamic power allocation and redistribution and adaptive sink current sensing for any or a combination of shared capacity and assured capacity power adapters.

6. The system as claimed in claim 1, wherein execution of the first set of instructions enable any initialization or reset of the plurality of ports by sending a first data packet to synchronize initialization of the plurality of ports, wherein upon the execution of first set of instructions, initial power is allocated to the plurality of ports, wherein the initial power allocated to the plurality of ports are any or a combination of a fixed power values in a first configuration, and variable power values in a second configuration.

7. The system as claimed in claim 1, wherein the first set of instructions and the second set of instructions uses the pre-defined resistances associated with each of the plurality of ports to configure said port regarding port address, master port status, Port-ID, Maximum Port power according any or a combination of a first power configuration and a second power configuration, and wherein the pre-defined resistances enable any port of the plurality ports to act as any master or slave.

8. The system as claimed in claim 7, wherein a plurality of controllers are operatively coupled to each port to enable auto discovery of the port status based on the plurality of ports tracked by the first set of instructions through a fixed format of the pre-defined resistances associated with each port.

9. The system as claimed in claim 1, wherein upon execution of the second set of instructions based on the first set of instructions, the request-response communication interface performs any or a combination of sending, broadcasting and cyclic redundancy check (CRC) of communication packets to all of the plurality of ports through a shared bus, wherein request-response communication packets are sent through physical layer.

10. The system as claimed in claim 9, wherein the CRC is configured to handle error correction of distorted data occurring due to high frequency switching noise in a physical layer.

11. The system as claimed in claim 1, wherein upon execution of the second set of instructions based on the first set of instructions, the request-response communication interface provides a configurable retry mechanism for non-responsive and failed communications.

12. The system as claimed in claim 1, wherein upon execution of the second set of instructions the request-response communication interface enables recovery of irresponsive ones of the plurality of ports through a watchdog mechanism, wherein the watchdog mechanism facilitates periodic execution of the first set of instructions to enable the second set of instructions to reset a watchdog timer internal to the port and upon timer expiry, reset the port, and communication block.

13. The system as claimed in claim 1, wherein the second set of instructions are configured to raise an alert signal or an interrupt signal associated with an event and wherein upon receiving said alert, the first set of instructions determines action to be taken for said event and updates a database about the plurality of ports and wherein the communication interface encapsulates the alert or the interrupt signal in any or a combination of in-band or out of band along with the physical communication protocol.

14. A method to enable power sharing in a multi-port power sourcing device, said method comprising:

receiving at the multi-port power sourcing device, a first set of instructions, one or more input parameters, wherein the one or more input parameters pertain to a plurality of ports associated with the power sourcing device, total power capacity of the multi-port power sourcing device and maximum power limit of each port of the plurality of ports;

determining, at the multi-port power sourcing device, by a second set of instructions, a second set of parameters pertaining to pre-defined resistances configured at the each port of the plurality of ports;

executing, at the multi-port power sourcing device, a first set of instructions based on the input parameters and the second set of parameters, the first set of instructions pertaining to any or a combination of power allocation, de-allocation, information exchange related to power across the plurality of ports;

executing, at the multi-port power sourcing device, a second set of instructions based on the executed first set of instructions, the second set of instructions being executed to manage at least one operation pertaining to the each port of the plurality of ports, wherein the executed first set of instructions facilitate implementation of the second set of instructions by communication via a request-response communication interface, wherein based on the determined second set of parameters and said communication the second set of instructions enable automated determination of any or a combination of a number of the plurality of ports and a status of the each port, wherein, when the multi-port power sourcing device is switched on, the first set of instructions executed on the multi-port power sourcing device activates each of the second set of instructions associated with each of the ports, wherein a master port is configured to maintain record of allocated power across the plurality of ports and inform each of the second set of instructions about power to be allocated, and wherein the second set of instructions are configured to enable delivery of power over its corresponding physical USB port based on a predefined protocol and the first set of instructions.

\* \* \* \* \*